US006897273B2

(12) United States Patent
Szul et al.

(10) Patent No.: US 6,897,273 B2
(45) Date of Patent: May 24, 2005

(54) CATALYST COMPOSITION, METHOD OF POLYMERIZATION AND POLYMER THEREFROM

(75) Inventors: John F. Szul, Nitro, WV (US); Tae Hoon Kwalk, Belle Mead, NJ (US); David James Schreck, Cross Lanes, WV (US); Simon Mawson, Charleston, WV (US); Matthew G. McKee, Charleston, WV (US); Kersten Anne Terry, South Charleston, WV (US); Mark G. Goode, Hurricane, WV (US); Gregory T. Whiteker, Charleston, WV (US); Eric A. Lucas, South Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 301 days.

(21) Appl. No.: 09/729,557

(22) Filed: Dec. 4, 2000

(65) Prior Publication Data

US 2002/0103310 A1 Aug. 1, 2002

(51) Int. Cl.$^7$ .............................. C08F 4/44; B01J 31/38
(52) U.S. Cl. ....................... 526/114; 526/115; 526/116; 526/117; 526/161; 526/172; 526/943; 502/117; 502/118; 502/152; 502/155

(58) Field of Search ................................ 526/114, 115, 526/116, 117, 161, 172, 943; 502/117, 118, 152, 155

(56) References Cited

U.S. PATENT DOCUMENTS 6,372,868 B1 * 4/2002 Szul et al. ................... 526/114

FOREIGN PATENT DOCUMENTS

| EP | 0 856 525 A | 8/1998 |
| JP | 2000 063415 | 2/2000 |
| WO | WO 97/48742 A | 12/1997 |

* cited by examiner

Primary Examiner—Robert D. Harlan

(57) ABSTRACT

This invention relates to a process to polymerize olefin(s) comprising combining a solution, slurry or solid comprising one or more bulky ligand metallocene catalyst compounds, an optional support, and or one or more activator(s) with a solution comprising one or more phenoxide catalyst compounds, and thereafter, introducing one or more olefin(s) and the combination into a polymerization reactor. This invention also relates to a polymer of ethylene wherein the polymer has a density of 0.910 to 0.930 g/cc, a melt index of 0.3 to 2.0 dg/min, and a 15 to 35 μm thick film of the polymer has a 45° gloss of 60 or more, a haze of 7% or less, and a dart impact of 600 g or more.

27 Claims, 1 Drawing Sheet

CATALYST COMPOSITION, METHOD OF POLYMERIZATION AND POLYMER THEREFROM

FIELD OF THE INVENTION

This invention is directed to a process for polymerizing olefin(s) where a solution, slurry or solid comprising at least one bulky ligand metallocene catalyst compound and at least one activator and a solution comprising at least one phenoxide catalyst compound are combined prior to being introduced to a polymerization reactor.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene catalyst systems. In a slurry or gas phase process typically a supported catalyst system is used, however, more recently unsupported catalyst systems are being used in these processes. For example, U.S. Pat. Nos. 5,317,036 and 5,693,727 and European publication EP-A-0 593 083 and PCT publication WO 97/46599 all describe various processes and techniques for introducing liquid catalysts to a reactor. There is a desire in the industry using this technology to reduce the complexity of the process, to improve the process operability, to increase product characteristics and to vary catalyst choices. Thus, it would be advantageous to have a process that is capable of improving one or more of these industry needs.

SUMMARY OF THE INVENTION

Figure 1:
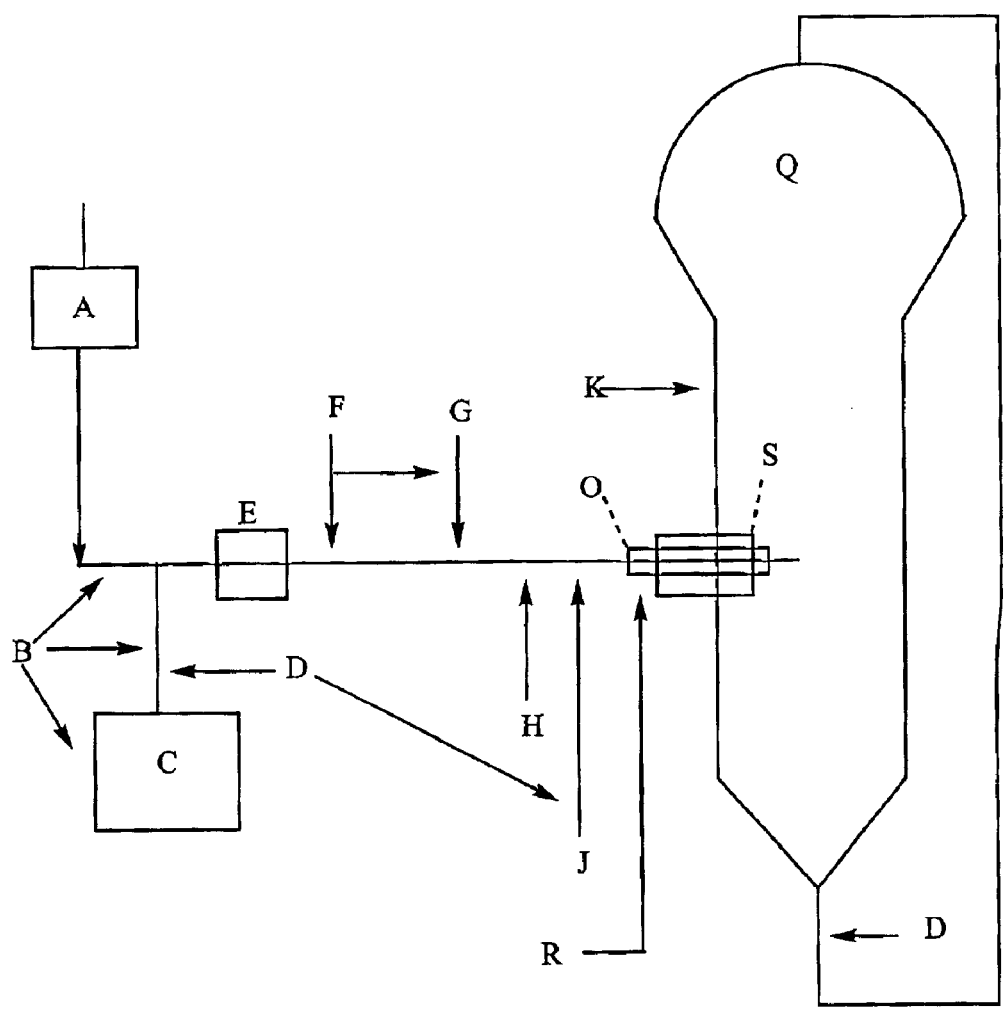
FIG. 1 illustrates an example of an equipment configuration for a preferred embodiment of the invention.

This invention is directed to a process for polymerizing olefin(s) where a solution, slurry or a solid comprising a bulky ligand metallocene catalyst compound and at least one activator (Component A) and a solution comprising at least one phenoxide catalyst compound (Component B) are combined, preferably in-line, prior to being introduced to a polymerization reactor. The length of time that Component A and Component B are contacted in the mixer is typically up to about 120 minutes, preferably about 1 to about 60 minutes, more preferably about 5 to about 40 minutes, even more preferably about 10 to about 30 minutes.

This invention also relates to a polymer of ethylene wherein the polymer has a density of 0.910 to 0.930 g/cc, a melt index of 0.3–2.0 dg/min, and a 15–35 μm thick film of the polymer has a 45° gloss of 60 or more, a haze of 7% or less, a dart impact of 600 g or more and in a preferred embodiment the films also have:

a) a TD tensile strength of 30 MPa or more, and or b) an MD tensile strength of 30 MPa or more, and or b) an MD and or TD modulus of 150 or more and or c) an MD Elmendorf tear of 180 g/mil or more, and or d) a TD Elmendorf tear of 300 g/mil or more.

DETAILED DESCRIPTION OF THE INVENTION

For purposes of this invention and the claims thereto a catalyst system comprises at least one activator and at least one catalyst compound. For the purposes of this invention a slurry is defined to be a suspension of a solid in a liquid. The solid may or may not be porous.

In a preferred embodiment both Component A and Component B are introduced into the reactor in a solution or solutions. For more information on methods to feed multiple solution catalysts into a polymerization reactor, please see U.S. Ser. No. 09/451,792, filed Dec. 1, 1999 and incorporated by reference herein. In some embodiments, for example, the catalyst system, the metal compounds and or the activator may be introduced into the reactor in one or more solutions. In one embodiment, a solution of the two activated metal compounds in an alkane such as pentane, hexane, toluene, isopentane or the like is introduced into a gas phase or slurry phase reactor. In another embodiment the catalysts system or the components can be introduced into the reactor in a suspension or an emulsion. In one embodiment, the second metal compound is contacted with the activator, such as modified methylalumoxane, in a solvent and just before the solution is fed into a gas or slurry phase reactor. In another embodiment, a solution of the first metal compound is combined with a solution of the second compound and the activator then introduced into the reactor. In a preferred embodiment, the solution is introduced into the reactor via a plenum which is described in U.S. Pat. No. 5,693,727, incorporated by reference herein.)

In another embodiment, Component A is a slurry or a solid comprising a support, a bulky ligand metallocene catalyst compound and at least one activator (supported Component A) and Component B is a solution comprising at least one phenoxide catalyst compound.

Typically, the bulky ligand metallocene catalyst compound(s) and the support are allowed to contact each other for a time sufficient for at least 50% of the catalyst compounds to be deposited in or on the support, preferably at least 70%, preferably at least 80%, more preferably at least 90%. Times allowed for mixing are up to 10 hours, typically up to 6 hours, more typically 4–6 hours. The bulky ligand metallocene compounds may be combined with the support in a liquid, such as mineral oil, toluene, hexane, etc. and may thereafter optionally be dried to a solid state, such as a powder.

After contacting supported Component A with Component B, all or substantially all, preferably at least 50% preferably at least 70%, preferably at least 75%, preferably at least 80%, more preferably at least 90%, preferably at least 95%, preferably at least 99% of the catalyst compound from the Component B is deposited in or on the support initially contained in the Component A. For purposes of this invention a catalyst compound will be considered to be in or on the support if the concentration of the catalyst compound in the liquid portion of the combination is reduced over time after adding the catalyst compound. Concentration of the catalyst compound may be measured for example, by gas chromatography (GC) mass spectroscopy (MS) after standardization with a calibration curve prepared at the appropriate concentration, range as is known in the art. Thus for example, 70% of a catalyst compound will be considered to have deposited in or on a support if the concentration of the catalyst compound in the liquid (not including the support) is reduced by 70% from its initial concentration.

The Component B may comprise additional activator or catalyst compounds. In another preferred embodiment activator is not present in Component B. In a preferred embodiment activator is present in Component B at less than 1 weight %, preferably less than 1000 ppm, preferably less than 100 ppm.

The support material may be any inert particulate carrier material known in the art, including, but not limited to, silica, fumed silica, alumina, clay, talc or other materials as disclosed below. In a preferred embodiment the activator is placed upon the support first to for supported activator and thereafter is contacted with the bulky ligand metallocene compound(s). A preferred supported activator is alumoxane and or modified alumoxane on silica or fumed silica, preferably methyl alumoxane and/or modified methyl alumoxane on a support of fumed silica.

In a particularly preferred embodiment, alumoxane, preferably methyl alumoxane or modified methyl alumoxane, is combined with a support such as calcined silica or fumed silica to form a supported activator, the supported activator is then dispersed in a liquid, such as degassed mineral oil to form a slurry, and then one or bulky ligand metallocene compounds are added to the dispersion and mixed. The catalyst compounds are preferably added to the dispersion as a powder or a solution, preferably a solution of mineral oil. If more than one catalyst compound is added to the dispersion, the catalyst compounds can be added sequentially or at the same time.

In a preferred embodiment the concentration of solids in supported Component A is maintained at greater than 0 to 90 wt % solids, more preferably 1 to 50 wt %, more preferably 5 to 40 wt %, even more preferably 10 to 30 wt %, based upon the weight of Component A. In another preferred embodiment the activator is present on the support at between about 0.5 to about 7 mmol/g, preferably about 2 to about 6 mmol/g, more preferably between about 4 to about 5 mmol/g.

Thereafter a solution comprising a phenoxide catalyst compound (Component B) is combined with the slurry. In a preferred embodiment, phenoxide catalyst compound is present in the solution at up to about 20 wt %, preferably a up to about 10 wt %, more preferably up to about 5 wt %, more preferably at less than 1 wt %, more preferably between 100 ppm and 1 wt % based upon the weight of the solvent and the phenoxide catalyst compound.

In another preferred embodiment the total amount of catalyst compound present on the support, preferably a supported activator, is about 1 to about 40 μmol/g, preferably about 10 to about 38 μmol/g, more preferably 30–36 μmol/g.

In one embodiment the final mole ratio (i.e. after combination of the bulky ligand catalyst compound(s) and the phenoxide metal compound(s)) of the metal of the catalyst compounds and the metal of the activator is in the range of from about 1000:1 to about 0.5:1 preferably from about 300:1 to about 1:1 more preferably from about 150:1 to about 1:1; for boranes, borates, aluminates, etc., the ratio is preferably about 1:1 to about 10:1 and for alkyl aluminum compounds (such as diethylaluminum chloride combined with water) the ratio is preferably about 0.5:1 to about 10:1.

In a preferred embodiment supported Component A comprises mineral oil and has a viscosity of about 130 to about 2000 cP at 20° C., more preferably about 150 to about 1000 cP at 20° C., more preferably about 180 to about 1500 cP at 20° C. even more preferably about 200 to about 800 cP at 20° C. as measured with a Brookfield model LV viscometer housed in a nitrogen purged drybox (in such a manner that the atmosphere is substantially free of moisture and oxygen, i.e. less than several ppmv of each). Supported Component A slurries are made up in a nitrogen purged drybox, and rolled in their closed glass containers until immediately before the viscosity measurements are made, in order to ensure that they are fully suspended at the start of the trial. Temperature of the viscometer is controlled via an external temperature bath circulating heat transfer fluid into the viscometer. The spindle is a SC4-34 spindle Rheocalc V1.1 software, copyright 1995, Brookfield Engineering Laboratories, purchased with the viscometer is preferably used.

In one embodiment the composition formed by combining supported Component A with Component B has a viscosity of about 130 to about 2000 cP at 20° C., more preferably about 150 to about 1000 cP at 20° C., more preferably about 180 to about 1500 cP at 20° C. even more preferably about 200 to about 600 cP at 20° C.

Bulky Ligand Metallocene Catalyst Compounds

In the process of this invention useful catalyst compounds include the traditional bulky ligand metallocene catalyst compounds include half and full sandwich compounds having one or more bulky ligands bonded to at least one metal atom. Typical bulky ligand metallocene compounds are generally described as containing one or more bulky ligand (s) and one or more leaving group(s) bonded to at least one metal atom. In one preferred embodiment, at least one bulky ligands is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds of the invention are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl ligands, heteroatom substituted and/or heteroatom containing cyclopentadienyl ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125 and WO 00/05236), aminomethylphosphine ligands (U.S. Pat. No. 6,034,240 and WO 99/46271), pyrrolyl ligands, pyrozolyl ligands, carbazolyl ligands, borabenzene ligands, B-diketiminate ligands (U.S. Pat. No. 6,034,258), fullerenes (U.S. Pat. No. 6,002,035) and the like, including hydrogenated versions thereof, for example tetrahydroindenyl ligands. In one embodiment, $L^A$ and $L^B$ may be any other ligand structure capable of η-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkylcarbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. In one embodiment, the bulky ligand metallocene catalyst compounds of the invention include those of formula (I) where $L^A$ and $L^B$ are bridged to each other by at least one bridging group, A, such that the formula is represented by

$$L^A A L^B M Q_n \qquad (II)$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, sulfur, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (II) have two or more bridging groups A (EP 664 301 B1) or the bridge is heteroatomic (U.S. Pat. No. 5,986,025).

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503, 5,962,718, 5,965,078, 5,965,756, 5,965,757, 5,977,270, 5,977,392, 5,986,024, 5,986,025, 5,986,029, 5,990,033 and 5,990,331 and PCT publications WO 93/08221, WO 93/08199, WO 95/07140, WO 98/11144, WO 98/41530, WO 98/41529, WO 98/46650, WO 99/02540, WO 99/14221 and WO 98/50392 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene catalyst compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene catalyst compound is represented by the formula:

$$L^C AJMQ_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene catalyst compound is represented by the formula:

$$L^D MQ_2(YZ)X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these metallocene catalyst compounds are described in WO 96/33202, WO 96/34021, WO 97/17379, WO 98/22486 and WO 99/40095 (dicarbamoyl metal complexes) and EP-A1-0 874 005 and U.S. Pat. No. 5,637,660, 5,539,124, 5,554,775, 5,756,611, 5,233,049, 5,744,417, and 5,856,258 all of which are herein incorporated by reference.

In another embodiment, new metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference. In one embodiment, these new metallocene catalyst compound is represented by the formula:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is within the scope of this invention, in one embodiment, that the new metallocene catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem.

Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below. Other new metallocene catalysts include those nickel complexes described in WO 99/50313, which is incorporated herein by reference.

Also included as metallocene catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference. Group 6 bulky ligand metallocene catalyst systems are described in U.S. Pat. No. 5,942,462, which is incorporated herein by reference. Other metallocene catalysts are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is herein incorporated herein by reference. Still other metallocene catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Illustrative but non-limiting examples of preferred bulky ligand metallocene catalyst compounds include:
bis(cyclopentadienyl)titanium dimethyl,
bis(cyclopentadienyl)titanium diphenyl,
bis(cyclopentadienyl)zirconium dimethyl,
bis(cyclopentadienyl)zirconium diphenyl,
bis(cyclopentadienyl)hafnium methyl and diphenyl,
bis(cyclopentadienyl)titanium di-neopentyl,
bis(cyclopentadienyl)zirconium di-neopentyl,
Bis(cyclopentadienyl)titanium dibenzyl,
bis(cyclopentadienyl)zirconium dibenzyl,
bis(cyclopentadienyl)vanadium dimethyl,
bis(cyclopentadienyl)titanium methyl chloride,
bis(cyclopentadienyl)titanium ethyl chloride,
bis(cyclopentadienyl)titanium phenyl chloride,
bis(cyclopentadienyl)zirconium methyl chloride,
bis(cyclopentadienyl)zirconium ethyl chloride,
bis(cyclopentadienyl)zirconium phenyl chloride,
bis(cyclopentadienyl)titanium methyl bromide,
cyclopentadienyl titanium trimethyl,
cyclopentadienyl zirconium triphenyl,
cyclopentadienyl zirconium trineopentyl,
cyclopentadienyl zirconium trimethyl,
cyclopentadienyl hafnium triphenyl,
cyclopentadienyl hafnium trineopentyl,
cyclopentadienyl hafnium trimethyl,
pentamethylcyclopentadienyl titanium trichloride,
pentaethylcyclopentadienyl titanium trichloride;
bis(indenyl)titanium diphenyl or dichloride,
bis(methylcyclopentadienyl)titanium diphenyl or dihalide,
bis(1,2-dimethylcyclopentadienyl)titanium diphenyl or dichloride,
bis(1,2-diethylcyclopentadienyl)titanium diphenyl or dichloride,
bis(pentamethylcyclopentadienyl)titanium diphenyl or dichloride;
dimethyl silyldicyclopentadienyl titanium diphenyl or dichloride,
methyl phosphine dicyclopentadienyl titanium diphenyl or dichloride,
methylenedicyclopentadienyl titanium diphenyl or dichloride,
isopropyl(cyclopentadienyl)(fluorenyl)zirconium dichloride,
isopropyl(cyclopentadienyl)(octahydrofluorenyl)zirconium dichloride,
diisopropylmethylene(cyclopentadienyl)(fluorenyl) zirconium dichloride,
diisobutylmethylene(cyclopentadienyl)(fluorenyl)zirconium dichloride,
ditertbutylmethylene(cyclopentadienyl)(fluorenyl) zirconium dichloride,
cyclohexylidene(cyclopentadienyl)(fluorenyl)zirconium dichloride,
diisopropylmethylene(2,5-dimethylcyclopentadienyl) (fluorenyl)zirconium dichloride,
isopropyl(cyclopentadienyl)(fluorenyl)hafniium dichloride,
diphenylmethylene(cyclopentadienyl)(fluorenyl)hafnium dichloride,
diisopropylmethylene(cyclopentadienyl)(fluorenyl)hafium dichloride,
diisobutylmethylene(cyclopentadienyl)(fluorenyl)hafium dichloride,
ditertbutylmethylene(cyclopentadienyl)(fluorenyl)hafnium dichloride,
cyclohexylidene(cyclopentadienyl)(fluorenyl)hafnium dichloride,
diisopropylmethylene(2,5-dimethylcyclopentadienyl) (fluorenyl)-hafnium dichloride,
isopropyl(cyclopentadienyl)(fluorenyl)titanium dichloride,
diphenylmethylene(cyclopentadienyl)(fluorenyl)titanium dichloride,
diisopropylmethylene(cyclopentadienyl)(fluorenyl)titanium dichloride,
diisobutylmethylene(cyclopentadienyl)(fluorenyl)titanium dichloride,
ditertbutylmethylene(cyclopentadienyl)(fluorenyl)titanium dichloride,
cyclohexylidene(cyclopentadienyl)(fluorenyl)titanium dichloride,
diisopropylmethylene(2,5 dimethylcyclopentadienyl fluorenyl)titanium dichloride,
racemic-ethylene bis(1-indenyl)zirconium(W)dichloride,
racemic-ethylene bis(4,5,6,7-tetrahydro-1-indenyl) zirconium (IV) dichloride, racemic-dimethylsilyl bis(1-indenyl)zirconium (IV) dichloride, racemic-dimethylsilyl bis(4,5,6,7-tetrahydro-1-indenyl) zirconium (IV) dichloride, racemic-1,1,2,2-tetramethylsilanylene bis(1-indenyl) zirconium (IV) dichloride, racemic-1,1,2,2-tetramethylsilanylene bis(4,5,6,7-tetrahydro-1-indenyl)zirconium (IV) dichloride, ethylidene(1-indenyl tetramethylcyclopentadienyl) zirconium (IV) dichloride, racemic-dimethylsilyl bis(2-methyl-4-t-butyl-1-cyclopentadienyl)zirconium (IV) dichloride, racemic-ethylene bis(1-indenyl)hafnimn (IV) dichloride, racemic-ethylene bis(4,5,6,7-tetrahydro-1-indenyl) hafiium (IV) dichloride, racemic-dimethylsilyl bis(1-indenyl)hafaium (IV) dichloride, racemic-dimethylsilyl bis(4,5,6,7-tetrahydro-1-indenyl) hafnium (IV) dichloride, racemic-1,1,2,2-tetramethylsilanylene bis(1-indenyl) hafnium (IV) dichloride, racemic-1,1,2,2-tetramethylsilanylene bis(4,5,6,7-tetrahydro-1-indenyl)hafnium (IV), dichloride, ethylidene(1-indenyl-2,3,4,5-tetramethyl-1-cyclopentadienyl)hafnium (IV) dichloride, racemic-ethylene bis(1-indenyl)titanium (IV) dichloride, racemic-ethylene bis(4,5,6,7-tetrahydro-1-indenyl) titanium (IV) dichloride, racemic-dimethylsilyl bis(1-indenyl)titanium (IV) dichloride, racemic-dimethylsilyl bis(4,5,6,7-tetrahydro-1-indenyl) titanium (IV) dichloride, racemic-1,1,2,2-tetramethylsilanylene bis(1-indenyl) titanium (IV) dichloride racemic-1,1,2,2-tetramethylsilanylene bis(4,5,6,7-tetrahydro-1-indenyl)titanium (IV) dichloride, and ethylidene(1-indenyl-2,3,4,5-tetramethyl-1-cyclopentadienyl)titanium (IV) dichloride.

Particularly preferred metallocene catalysts are diphenylmethylene (cyclopentadienyl)(fluorenyl)zirconium dichloride, racemic-dimethylsilyl bis(2-methyl-1-indenyl) zirconium (IV) dichloride, racemic-dimethylsilyl bis(2-methyl-4-(1-naphthyl-1-indenyl)zirconium (IV) dichloride, and racemic-dimethylsilyl bis(2-methyl-4-phenyl-1-indenyl)zirconium (IV) dichloride.

Phenoxide Catalyst Compounds

Preferred phenoxide catalysts include those represented by the formulae:

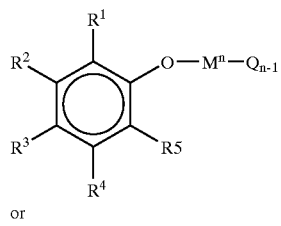

or

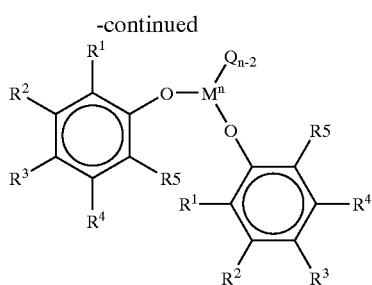

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$. A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The heteroatom containing group may contain one or more of the same or different heteroatoms. Preferred heteroatom groups include imines, amines, oxides, phosphines, ethers, ketenes, oxazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

These phenoxide catalysts may be activated with activators including alkyl aluminum compounds (such as diethylaluminum chloride), alumoxanes, modified alumoxanes, non-coordinating anions, non-coordinating group 13 metal or metalliod anions, boranes, borates and the likepreferred embodiment of which are described below.

See for example U.S. application Ser. No.: 09/451,792, filed Dec. 1, 1999, which is incorporated by reference herein, describing these types of phenoxide catalyst compounds.

In a preferred embodiment the phenoxide catalyst compound comprises one or more of:

bis(N-methyl-3,5-di-t-butylsalicylimino)zirconium(IV) dibenzyl;

bis(N-ethyl-3,5-di-t-butylsalicylimino)zirconium(IV) dibenzyl;

bis(N-iso-propyl-3,5-di-t-butylsalicylimino)zirconium(IV) dibenzyl;

bis(N-t-butyl-3,5-di-t-butylsalicylimino)zirconium(IV) dibenzyl;

bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl-3,5-di-t-butylsalicylimino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;
bis(N-benzyl-3,5-di-t-butylsalicylimino)titanium(IV) dipivalate;
bis(N-benzyl-3,5-di-t-butylsalicylimino)zirconium(IV) di(bis(dimethylamide));
bis(N-iso-propyl-3,5-di-t-amylsalicylimino)zirconium(IV) dibenzyl;
bis(N-iso-propyl-3,5-di-t-octylsalicylimino)zirconium(IV) dibenzyl;
bis(N-iso-propyl-3,5-di-(1',1'-dimethylbenzyl)salicylimino) zirconium(IV) dibenzyl;
bis(N-iso-propyl-3,5-di-(1',1'-dimethylbenzyl)salicylimino) titanium(IV) dibenzyl;
bis(N-iso-propyl-3,5-di-(1',1'-dimethylbenzyl)salicylimino) hafnium(IV) dibenzyl;
bis(N-iso-butyl-3,5-di-(1',1'-dimethylbenzyl)salicylimino) zirconium(IV) dibenzyl;
bis(N-iso-butyl-3,5-di-(1',1'-dimethylbenzyl)salicylimino) zirconium(IV) dichloride;
bis(N-hexyl-3,5-di-(1',1'-dimethylbenzyl)salicylimino) zirconium(IV) dibenzyl;
bis(N-phenyl-3,5-di-(1',1'-dimethylbenzyl)salicylimino) zirconium(IV) dibenzyl;
bis(N-iso-propyl-3,5-di-(1'-methylcyclohexyl)salicylimino) zirconium(IV) dibenzyl;
bis(N-benzyl-3-t-butylsalicylimino)zirconium(IV) dibenzyl;
bis(N-benzyl-3-triphenylmethylsalicylimino)zirconium(IV) dibenzyl;
bis(N-iso-propyl-3,5-di-trimethylsilylsalicylimino) zirconium(IV) dibenzyl;
bis(N-iso-propyl-3-(phenyl)salicylimino)zirconium(IV) dibenzyl;
bis(N-benzyl-3-(2',6'-di-iso-propylphenyl)salicylimino) zirconium(IV) dibenzyl;
bis(N-benzyl-3-(2',6'-di-phenylphenyl)salicylimino) zirconium(IV) dibenzyl;
bis(N-benzyl-3-t-butyl-5-methoxysalicylimino)zirconium (IV) dibenzyl;
bis(2-(2H-benzotriazol-2-yl)-4,6-di-t-amylphenoxide) zirconium(IV) dibenzyl;
bis(2-(2H-benzotriazol-2-yl)-4,6-di-t-amylphenoxide) zirconium(IV) dichloride;
bis(2-(2H-benzotriazol-2-yl)-4,6-di-t-amylphenoxide) zirconium(IV) di(bis(dimethylamide));
bis(2-(2H-benzotriazol-2-yl)-4,6-di-(1',1'-dimethylbenzyl) phenoxide)zirconium(IV) dibenzyl;
bis(2-(2H-benzotriazol-2-yl)-4,6-di-t-amylphenoxide) titanium(IV) dibenzyl;
bis(2-(2H-benzotriazol-2-yl)-4,6-di-(1',1'-dimethylbenzyl) phenoxide)titanium(IV) dibenzyl;
bis(2-(2H-benzotriazol-2-yl)-4,6-di-(1',1'-dimethylbenzyl) phenoxide)titanium(IV) dichloride;
bis(2-(2H-benzotriazol-2-yl)-4,6-di-(1',1'-dimethylbenzyl) phenoxide)hafnium(IV) dibenzyl;
(N-phenyl-3,5-di-(1',1'-dimethylbenzyl)salicylimino) zirconium(IV) tribenzyl;
(N-(2',6'-di-iso-propylphenyl)-3,5-di-(1',1'-dimethylbenzyl) salicylimino)zirconium(IV) tribenzyl;
(N-(2',6'-di-iso-propylphenyl)-3,5-di-(1',1'-dimethylbenzyl) salicylimino)titanium(IV) tribenzyl; and
(N-(2',6'-di-iso-propylphenyl)-3,5-di-(1',1'-dimethylbenzyl) salicylimino)zirconium(IV) trichloride.

Activator and Activation Methods for the Metallocene Catalyst Compounds

The above described catalyst compounds are typically activated in various ways to yield catalyst systems having a vacant coordination site that will coordinate, insert, and polymerize olefin(s). For the purposes of this patent specification and appended claims, the term "activator" is defined to be any compound or component or method which can activate any of the catalyst compounds of the invention as described above. Non-limiting activators, for example may include a Lewis acid or a non-coordinating ionic activator or ionizing activator or any other compound including Lewis bases, aluminum alkyls, conventional cocatalysts and combinations thereof that can convert a neutral metallocene catalyst compound to a catalytically active bulky ligand metallocene cation. It is within the scope of this invention to use alumoxane or modified alumoxane as an activator, and/or to also use ionizing activators, neutral or ionic, such as tri(n-butyl)ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof, that would ionize the neutral metallocene catalyst compound.

In one embodiment, an activation method using ionizing ionic compounds not containing an active proton but capable of producing both a catalyst cation and a non-coordinating anion are also contemplated, and are described in EP-A-0 426 637, EP-A-0 573 403 and U.S. Pat. No. 5,387,568, which are all herein incorporated by reference. An aluminum based ionizing activator is described in U.S. Pat. No. 5,602, 269 and boron and aluminum based ionizing activators are described in WO 99/06414, which are incorporated herein by reference, and are useful in this invention.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A preferred alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

Organoaluminum compounds as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris(2,2',2''-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating metallocene catalyst compounds with perchlorates, periodates and iodates including their hydrates. WO 98/30602 and WO 98/30603 incorporated by reference describe the use of lithium(2,2'-bisphenyl-ditrimethylsilicate).4THF as an activator for a metallocene catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electrochemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in for example, U.S. Pat. Nos. 5,849,852, 5,859,653 and 5,869,723 and WO 98/32775, WO 99/42467 (dioctadecylmethyl-ammonium-bis(tris(pentafluorophenyl)borane)benzimidazolide), which are herein incorporated by reference.

Illustrative, but not limiting examples of boron compounds which may be used as an activating cocatalyst in the preparation of the improved catalysts of this invention are tri-substituted ammonium salts such as:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate, and
N,N-dimethyl-(2,4,6-trimethylanilinium)tetrakis-(2,3,4,6-tetrafluorophenyl)borate;
di-(i-propyl)ammonium tetrakis(pentafluorophenyl)borate,
dicyclohexylammonium tetrakis(pentafluorophenyl)borate;
triphenylphosphonium tetrakis(pentafluorophenyl)borate,
tri(o-tolyl)phosphonium tetrakis(pentafluorophenyl)borate, and
tri(2,6-dimethylphenyl)phosphonium tetrakis(pentafluorophenyl)borate.

Supports, Carriers and General Supporting Techniques

The above described catalyst compounds, activators and/or catalyst systems may be combined with one or more support materials or carriers. For example, in a preferred embodiment, the activator is contacted with a support to form a supported activator wherein the activator is deposited on, contacted with, vaporized with, bonded to, or incorporated within, adsorbed or absorbed in, or on, a support or carrier. In another preferred embodiment the catalyst compound is contacted with a support to form a supported catalyst compound wherein the catalyst compound is deposited on, contacted with, vaporized with, bonded to, or incorporated within, adsorbed or absorbed in, or on, a support or carrier. In another embodiment, the catalyst compound and the activator are combined and thereafter contacted with a support to form a supported catalyst system wherein the system is deposited on, contacted with, vaporized with, bonded to, or incorporated within, adsorbed or absorbed in, or on, a support or carrier.

Suitable support materials include inorganic or organic support materials, preferably a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

Preferred support materials include inorganic oxides that include those Group 2, 3, 4, 5, 13 or 14 metal oxides. The preferred supports include silica, famed silica, alumina (WO 99/60033), silica-alumina and mixtures thereof. Other useful supports include magnesia, titania, zirconia, magnesium chloride (U.S. Pat. No. 5,965,477), montmorillonite (EP-B1 0 511 665), phyllosilicate, zeolites, talc, clays (6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is famed silica available under the trade name Cabosil™ TS-610, available from Cabot Corporation. Fumed silica is typically a silica with particles 7 to 30 nanometers in size that has been treated with dimethylsilyldichloride such that a majority of hydroxyl groups are capped.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu$m. More preferably, the surface area of the support is in the range of from about 50 to about 500 m²/g, pore volume of from about 0.5 to about 3.5 cc/g and average particle size of from about 10 to about 200 μm. Most preferably the surface area of the support is in the range from about 100 to about 1000 m²/g, pore volume from about 0.8 to about 5.0 cc/g and average particle size is from about 5 to about 100 μm. The average pore size of the support material of the invention typically has pore size in the range of from 10 to 1000 Å, preferably 50 to about 500 Å, and most preferably 75 to about 450 Å.

There are various methods known in the art for producing a supported activator or combining an activator with a support material. In an embodiment, the support material is chemically treated and/or dehydrated prior to combining with the catalyst compound, activator and/or catalyst system.

In one embodiment, an alumoxane is contacted with a support material, preferably a porous support material, more preferably a inorganic oxide, and most preferably the support material is silica.

In an embodiment, the support material, having a various levels of dehydration, preferably 200° C. to 600° C. dehydrated silica, that is then contacted with an organoaluminum or alumoxane compound. In specifically the embodiment wherein an organoaluminum compound is used, the activator is formed in situ the support material as a result of the reaction of, for example, trimethylaluminum and water.

In yet another embodiment, a Lewis base-containing support substrates will react with a Lewis acidic activator to form a support bonded Lewis acid compound. The Lewis base hydroxyl groups of silica are exemplary of metal/metalloid oxides where this method of bonding to a support occurs. This embodiment is described in U.S. patent application Ser. No. 09/191,922, filed Nov. 13, 1998, which is herein incorporated by reference. Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603–1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In the preferred embodiment, the supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range of from about 10 weight percent to about 70 weight percent, preferably in the range of from 20 weight percent to about 60 weight percent, more preferably in the range of from about 30 weight percent to about 50 weight percent, and most preferably in the range of from 30 weight percent to about 40 weight percent.

Preferred slurries comprising supported activators and bulky ligand metallocene catalyst compounds used in the process of this invention are typically prepared by suspending the supported activator and/or catalyst compound in a liquid diluent. The liquid diluent is typically an alkane having from 3 to 7 carbon atoms, preferably a branched alkane or an organic composition such as mineral oil. The diluent employed should be liquid under the conditions of polymerization and relatively inert. The concentration of the components in the slurry is controlled such that a desired ratio of catalyst compound(s) to activator, and/or catalyst compound to catalyst compound is fed into the reactor. The components are generally fed into the polymerization reactor as a mineral oil slurry. Solids concentrations in oil are about 10–15 weight %, preferably 11–14 weight %.

Spray Drying

The metal compounds and/or the activators are may be combined with a support material such as a particulate filler material and then spray dried, preferably to form a free flowing powder. Spray drying may be by any means known in the art. Please see EPA 0 668 295 B1, U.S. Pat. Nos. 5,674,795 and 5,672,669 which particularly describe spray drying of supported catalysts. In general one may spray dry the catalysts by placing the catalyst compound and the optional activator in solution, (allowing the catalyst compound and activator to react, if desired), adding a filler material such as silica or Cabosil™ (as described above), then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Typical slurry concentrations are about 5–8 wt %. This formulation may sit as a slurry for as long as 30 minutes with mild stirring or manual shaking to keep it as a suspension before spray-drying. In one preferred embodiment, the makeup of the dried material is about 40–50 wt % activator, (preferably alumoxane), 50–60 $SiO_2$ and about ~2 wt % catalyst compound.

In another embodiment binders are added to the mix prior to spray drying. These can be added as a means of improving the particle morphology, i.e. narrowing the particle size distribution, lower porosity of the particles and allowing for a reduced quantity of alumoxane, which is acting as the 'binder'.

The spray dried particles are generally fed into the polymerization reactor as a mineral oil slurry. Solids concentrations in oil are about 10–15 weight %, preferably 11–14 weight %. In some embodiments, the spray dried particles are <~10 micrometers in size from the lab-scale Buchi spray-dryer, while the scaled up rotary atomizers can create particles ~25 micrometers, compared to conventional supported catalysts which are ~50 micrometers. In a preferred embodiment the support has an average particle size of 0.001 to 1 microns, preferably 0.001 to 0.1 microns.

In a preferred embodiment, a slurry comprising a silica supported methyl alumoxane and bis(2-methyl, 4-butyl cyclopentadienyl)zirconium dichloride is combined on-line with a solution of bis(N-iso-butyl-3-t-butylsalicyclimino) zirconium(IV)dibenzyl and introduced into the reactor to produced ethylene homopolymers or copolymers.

Catalyst System Addition Process

In a preferred embodiment a bulky ligand metallocene compound, a support and an activator are combined to form a slurry. The slurry is typically prepared by suspending the support, the activator and catalyst compounds in a liquid diluent. The liquid diluent is typically an alkane having from 3 to 60 carbon atoms, preferably having from 5 to 20 carbon atoms, preferably a branched alkane, or an organic composition such as mineral oil or silicone oil. The diluent employed is preferably liquid under the conditions of polymerization and relatively inert.

The slurry is then preferably combined with a solution comprising phenoxide catalyst compound. The solution is typically prepared by dissolving catalyst compound in a liquid solvent. The liquid solvent is typically an alkane, such as a $C_5$ to $C_{30}$ alkane, preferably a $C_5$ to $C_{10}$ alkane. Cyclic alkanes such as toluene may also be used. A preferred solvent is mineral oil. The solution employed should be liquid under the conditions of polymerization and relatively inert.

In a preferred embodiment, a slurry, preferably a mineral oil slurry, comprising at least one support, one bulky ligand metallocene compound, and at least one activator, preferably at least one supported activator is mixed in a mixer (A). A solution is prepared by mixing a solvent and at least one phenoxide catalyst compound or activator in a mixer (C). The slurry is then combined in-line with the solution. A nucleating agent, such as silica, alumina, famed silica or any other particulate matter, may be added (B) to the slurry and or the solution in-line or in the mixers (A) or (C). Similarly, additional activators or catalyst compounds (D) may be added in-line in powder or solution form to the slurry, the solution, or the combination of the slurry and the solution. The combination is then preferably mixed in-line (E) or in a mixer for a period of time, typically up to about 120 minutes, preferably about 1 to about 60 minutes, more preferably about 5 to about 40 minutes, even more preferably about 10 to about 30 minutes.

In another preferred embodiment, alkyls (F), such as an aluminum alkyl, an ethoxylated aluminum alkyl, an alumoxane, an anti-static agent or a borate activator, such as a $C_1$ to $C_{15}$ alkyl aluminum (for example tri-isobutyl aluminum, trimethyl aluminum or the like), a $C_1$ to $C_{15}$ ethoxylated alkyl aluminum or methyl alumoxane, ethyl alumoxane, isobutylalumoxne, modified alumoxane or the like are added to the mixture of the slurry and the solution in line. The alkyls, antistatic agents, borate activators and/or alumoxanes may be added directly to the mixture of the solution and the slurry or may be added via an alkane (such as isopentane, hexane, heptane, and or octane) carrier stream (G). Preferably, the alkyls, etc. are present at up to about 500 ppm, more preferably at about 1 to about 300 ppm, more preferably at 10 to about 300 ppm, more preferably at about 10 to about 100 ppm. Preferred carrier streams include isopentane and or hexane. The alkane may be added (G) to the mixture of the slurry and the solution, typically at a rate of about 20 to about 60 lbs/hr (27 kg/hr). Likewise carrier gas, such as nitrogen, argon, ethane, propane and the like may be added in-line (H) to the mixture of the slurry and the solution. Typically the carrier gas may be added at the rate of about 1 to about 100 lb/hr (0.4–45 kg/hr), preferably about 10 to about 50 lb/hr (5–23 kg/hr), more preferably about 1 to about 25 lb/hr (0.4–11 kg/hr).

Similarly, hexene (or other alpha-olefin or diolefin) may be added in-line (J) to the mixture of the slurry and the solution. The slurry/solution mixture is then preferably passed through an injection tube (O) to the reactor (Q). The injection tube (O) may be supported inside a larger support tube (S), such as a 1 inch (2.54 cm) tube. In some embodiments, the injection tube may aerosolize the slurry/solution mixture. In a preferred embodiment the injection tube has a diameter of about 1/16 ths inch to about 1/2 inch (0.16 cm to 1.27 cm), preferably about 3/16 ths inch to about 3/8ths inch (0.5 cm to 0.9 cm), more preferably 1/4 inch to about 3/8ths inch (0.6 cm to 0.9 cm).

Nucleating agents (K), such as fumed silica, can be added directly in to the reactor. Recycle gas alone or in combination with ethylene or other monomers can also be added back in to the reactor.

In another embodiment a plenum may be used in this invention. A plenum is a device used to create a particle lean zone in a fluidized bed gas-phase reactor, as described in detail in U.S. Pat. No. 5,693,727 which is incorporated herein by reference. A plenum may have one, two, or more injection nozzles.

The catalyst injection tube passes into the reactor through a compressed chevron packing and extends into the fluid bed a distance of about 0.1 inch to 10 feet (0.25 cm to 3.1 m), preferably about 1 inch to 6 ft (2.5 cm to 1.8 m), and more preferably about 2 inches to 5 feet (5 cm to 1.5 m). Typically, the depth of insertion depends on the diameter of the reactor and typically extends in about 1/20th to 2/4's of the reactor diameter, preferably about 1/10th to 1/2 and more preferably about 1/5th to 1/3rd of the reactor diameter. The end of the tube may be cut perpendicular to the axis to create a nozzle cone or point with an angle ranging from 0 to 90 degrees, preferably ranging from about 10 to 80 degrees. The lip of the hole can be taken to a new knife-edge. The tube can be positioned to reduce resin adhesion or coated with an antifouling or antistatic compound. The tube can also be cut diagonally at an angle simply from about 0 to 80 degrees off the axial line of the tube, preferably about 0 to 60 degrees. The opening of the tube can be the same as the bore of the tube or expanded or diminished to create a nozzle, with sufficient pressure drop and geometry to provide a dispersed spray of a solution slurry and or powder into the reactor, preferably into the fluid bed.

The injection tube can optionally be supported inside a structure within the fluid bed to provide structural integrity. This support tube is typically a heavy walled pipe with an internal diameter of from about 1/4 inch to about 5 inches (0.64 cm to 12.7 cm), preferably about 1/2 inch to about 3 inches (1.3 cm to 7.6 cm), and more preferably about 3/4 inch to about 2 inches (1.9 cm to 5 cm). The support tube preferably extends through the reactor wall to approximately the length of the injection tube, allowing the injection tube to end just inside the end of the support tube or to extend past it up to about 10 inches (25.4 cm). Preferably, the injection tube extends about 0.5 to 5 inches (1.8 cm to 12.7 cm) beyond the end of the support tube and more preferably about 1 to 3 inches (2.5 cm to 7.6 cm). The end of the support tube in the reactor may be cut flat and perpendicular to the axis of the tube or preferably, may be tapered at an angle ranging from about 10 to 80 degrees. The end of the support tube may be polished or coated with an anti-static or anti-fouling material.

A purge flow of fluid (R) (typically fresh monomer, ethylene, hexane isopentane, recycle gas, and the like) is preferably introduced from outside the reactor down the support tube to aid in dispersion of the solution slurry or powder comprising catalyst compound and or activator allowing the production of resin granular particles of good morphology with decreased agglomeration and an APS (average particle size) in the range of about 0.005 to 0.10 inches (0.01 cm to 0.3 cm). The purge flow of fluid helps minimize fouling of the end of the catalyst injection tube and support tubes. The fluid introduced to the support tube may comprise hydrogen; olefins or diolefins, including but not limited to $C_2$ to $C_{40}$ alpha olefins and $C_2$ to $C_{40}$ diolefins, ethylene, propylene, butene, hexene, octene, norbornene, pentene, hexadiene, pentadiene, isobutylene, octadiene, cyclopentadiene, comonomer being used in the polymerization reaction, hydrogen; alkanes, such $C_1$ to $C_{40}$ alkanes, including but not limited to isopetane, hexane, ethane, propane, butane, and the like; mineral oil, cycle gas with or without condensed liquids; or any combination thereof. Preferably the support tube flow is fresh ethylene or propylene that may be heated or cycle gas that may be taken before or after passing through a heat exchanger. In addition, an alkane, such as for instance isopentane or hexane, can be included in the flow at the level ranging from about 0.001 wt % to about 50% of the flow. The alkane can be dispersed in the flow and may exist as dispersed liquid droplets or be vaporized at the exit of the support tube. The presence of liquid may reduce fouling at the exit.

The flow rate of fluid in the support tube ranges from about 5 to 10,000 pph and is somewhat dependent upon the reactor size. The linear velocity of the fluid in the support tube ranges from about 10 to 500 ft/sec (11 to 549 km/hr), preferably about 20 to 300 ft/sec (22 to 329 km/hr) and more preferably about 30 to 200 ft/sec (33 to 219 km/hr).

Alternatively, the exit of the support tube may be fashioned as an orifice or nozzle at the end to form a jet or dispersion of gas to aid in the distribution of the solution, slurry or powder comprising catalyst compound. In one embodiment, the internal diameter of the support tube is reduced gradually by about 3 to 80% at the end, preferably about 5 to 50% in a taper to create a nozzle to accelerate to and or disperse the fluid flow. The insertion of the injection tube is not impacted by the internal taper of the support tube.

In an embodiment the contact temperature of Component A and Component B is in the range of from 0° C. to about 80° C., preferably from about 0° C. to about 60° C., more preferably from about 10° C. to about 50° C. and most preferably from about 20° C. to about 40° C.

In one embodiment, the invention provides introducing the immobilized catalyst system in the presence of a mineral oil or a surface modifier or a combination thereof as described in PCT publication WO 96/11960 and U.S. Ser. No. 09/113,261 filed Jul. 10, 1998, which are herein fully incorporated by reference. In a preferred embodiment a slurry of surface modifier, such as an aluminum stearate in mineral oil) is co-introduced (J) into the reactor with combination of the slurry and the solution. In another embodiment the surface modifier, such as aluminum stearate, was added into the slurry (A).

In another preferred embodiment the one or all of the catalysts are combined with up to 6 weight % of a metal stearate, (preferably a aluminum stearate, more preferably aluminum distearate) or an anti-static agent based upon the weight of the catalyst, any support and the stearate or anti-static agent, preferably 2 to 3 weight %. In one embodiment, a solution or slurry of the metal stearate or anti-static agent is fed into the reactor. The stearate or anti-static agent may be combined with the slurry (A) or the solution (C) or may be co-fed (R) with the combination of the slurry and the solution. In a preferred embodiment the catalyst compounds and or activators are combined with about 0.5 to about 4 weight % of an antistat, such as a methoxylated amine, such as Witco's Kemamine AS-990 from ICI Specialties in Bloomington Del.

In another embodiment the catalyst system or the components thereof are combined with benzil, xylitol, Irganox™ 565, sorbitol or the like and then fed into the reactor. These agents may be dry tumbled with the catalyst compounds and/or activators or may be fed into the reactor in a solution with or without the catalyst system or its components. Similarly these agents may be combined with the slurry (A) or the solution (C) or may be co-fed (R) with the combination of the slurry and the solution.

In another embodiment, the immobilized catalyst system or catalyst system mixture or components thereof may be contacted with a carboxylate metal salt as described in PCT publication WO 00/02930 and WO 00/2931, which are herein incorporated by reference.

In a preferred embodiment a mixer is present in the slurry tank (A) to agitate the slurry.

Polymerization Process

The catalyst systems prepared above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 5,986,021, which are herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr). Examples of solution processes are described in U.S. Pat. Nos. 4,271,060, 5,001,205, 5,236,998, 5,589,555 and 5,977,251 and PCT WO 99/32525 and PCT WO 99/40130, which are fully incorporated herein by reference A preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. No. 5,712,352 and 5,763,543, which are herein fully incorporated by reference.

In one embodiment of the invention, olefin(s), preferably $C_2$ to $C_{30}$ olefin(s) or alpha-olefin(s), preferably ethylene or propylene or combinations thereof are prepolymerized in the presence of the metallocene catalyst systems of the invention described above prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with a carboxylate metal salt and a flow improver, as a solid or a liquid, to a reactor using the injection methods described in PCT publication WO 97/46599, which is fully incorporated herein by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, preferably have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably in the range from about 0.910 to about 0.925 g/cc. Density is measured in accordance with ASTM-D-1238.

The polymers produced by the process of the invention preferably have a molecular weight distribution, i.e. the ratio of the weight average molecular weight to the number average molecular weight ($M_w/M_n$), of greater than 1.5 to about 15, particularly greater than 2 to about 10, more preferably greater than about 2.2 to less than about 8, and most preferably from 2.5 to 8.

Also, the polymers of the invention preferably have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. Preferably the polymers produced herein have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced herein have a CDBI less than 50%, more preferably less than 40%, and most preferably less than 30%.

The polymers of the present invention preferably have a melt index (MI) or ($I_2$) as measured by ASTM-D-1238-E in the range from 0.01 dg/min to 1000 dg/min, more preferably from about 0.05 dg/min to about 100 dg/min, even more preferably from about 0.1 dg/min to about 50 dg/min, and most preferably from about 0.1 dg/min to about 10 dg/min.

The polymers of the invention preferably have a melt index ratio ($I_{21}/I_2$) ($I_{21}$ is measured by ASTM-D-1238-F) of from about 5 to less than 40, more preferably from about 10 to less than 30, even more preferably from about 15 to less than 25.

In another embodiment the process of this invention produces a polymer of ethylene having a density of 0.90 to 0.95 g/cc, preferably 0.905 to 0.940 g/cc, more preferably 0.910 to 0.930 g/cc, measured according to ASTM D 1505.

In another embodiment the process of this invention produces a polymer of ethylene that when blown into a film of 15–35 microns thickness has a 45° gloss of 60 or more, preferably 70 or more, preferably between 70 and 100, measured according to ASTM D 2475, and/or a haze of 7% or less, preferably 6% or less, more preferably between 4 and 8%, measured according to ASTM 1003-95, Condition A, and/or a dart impact of 600 g or more, preferably 700 grams or more, preferably 750 grams or more, measured according to ASTM D 1709.

In a preferred embodiment the 15–35 μm thick films described above also have:

a) a TD tensile strength of 30 MPa or more, preferably 35 MPa or more, preferably 40 MPa or more, measured according to ASTM D 882, and/or b) an MD tensile strength of 30 MPa or more, preferably 35 MPa or more, preferably 40 MPa or more, measured according to ASTM D 882, and/or c) an MD modulus of 150 MPa or more, preferably 180 MPa or more, preferably 200 MPa or more, measured according to ASTM D 412, and/or d) a TD modulus of 150 MPa or more, preferably 180 MPa or more, preferably 200 MPa or more, measured according to ASTM D 412, and/or e) an MD Elmendorf tear of 180 g/mil or more, preferably 200 g/mil or more, preferably 250 g/mil or more, measured according to ASTM D 1922, and/or f) a TD Elmendorf tear of 300 g/mil or more, preferably 350 g/mil or more, preferably 400 g/mil or more, measured according to ASTM D 1922.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art, see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as agricultural film, horticulture film, shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered Mn and Mw were measured by gel permeation chromatography on a waters 150° C. GPC instrument equipped with differential refraction index detectors. The GPC columns were calibrated by running a series of molecular weight standards and the molecular weights were calculated using Mark Houwink coefficients for the polymer in question.

Melt Index (MI) $I_2$ and Flow Index (FI) $I_{21}$ were measured according to ASTM D-1238, Condition E, at 190° C.

Melt Index Ratio (MIR) is the ratio of $I_{21}$ over $I_2$ as determined by ASTM D-1238.

$I_2$ was measured according to ASTM D-1238, Condition E, at 190° C.

Dart Impact Strength was measured according to ASTM D 1709.

Density was measured according to ASTM D 1505.

MD and TD Elmendorf Tear were measured according to ASTM D 1922.

MD and TD tensile strength were measured according to ASTM D 882.

MD and TD elongation were measured according to ASTM D 412.

Haze was measured according to ASTM 1003-95, Condition A. 45° gloss was measured according to ASTM D 2457. MD and TD Modulus were measured according to ASTM D 412. BUR is blow up ratio. "PPH" is pounds per hour. "mPPH" is millipounds per hour. "ppmw" is parts per million by weight. "MD" is machine direction and "TD" is transverse direction. Linear low-density polyethylene (LLDPE) polymers were produced using bis(N-iso-butyl-3-t-butylsalicylimino)zirconium(IV) dibenzyl (Catalyst 1) and bis(1,3 methyl-n-butyl cyclopentadienyl)-zirconium dichloride (Catalyst 2).

Example 1

An ethylene hexene copolymer (Sample 1) was produced in a 14-inch (35.6 cm) pilot plant scale gas phase fluidized bed reactor operating at 85° C. and 350 psig (2.4 MPa) total reactor pressure having a water cooled heat exchanger. Ethylene was fed to the reactor at a rate of about 46 pounds per hour (21 kg/hr), hexene was fed to the reactor at a rate of about 4.9 pounds per hour (2.2 kg/hr) and hydrogen was fed to the reactor at a rate of 0.7 mPPH (0.0003 kg/hr). Ethylene was fed to maintain 220 psi (1.5 MPa) ethylene partial pressure in the reactor. Hexene was continuously fed to maintain a 0.02 C6/C2 molar ratio. Hydrogen feed rate was controlled to maintain a 100–110 ppm hydrogen in the cycle gas. The production rate was about 27 PPH (12.3 kg/hr). The reactor was equipped with a plenum having about 2100 lb/hr (953 kg/hr)of recycle gas flow. (The plenum is a device used to create a particle lean zone in a fluidized bed gas-phase reactor. See U.S. Pat. No. 5,693,727.) A tapered catalyst injection nozzle having a 0.055 inch (0.14 cm) hole size was positioned in the plenum gas flow. A solution of 0.02 Molar Catalyst 1 in toluene was mixed with 0.1 lb/hr (0.05 kg/hr) hexene in a 3/16 inch (0.1 cm) stainless steel tube. The Catalyst 1 and hexene mixture were mixed with cocatalyst (MMAO-3A, 1 wt % Aluminum in hexane) in a line for about 15 minutes. A 0.01 Molar Catalyst 2 in toluene solution was added to the activated Catalyst 1 solution for about 5 minutes before being sprayed into the reactor. The molar ratio of Catalyst 2 to Catalyst 1 was 0.93. In addition to the solution, nitrogen was added to the injection tube to help control particle size. All materials were combine and were passed through the injection nozzle into the fluidized bed. MMAO to catalyst ratio was controlled so that the final Al:Zr molar ratio was 500. The polymer residual zirconium of 0.53 ppm was calculated based on a reactor mass balance.

Example 2

An ethylene hexene copolymer (Sample 2) was produced according to the procedure in example 1 except that ethylene was fed to the reactor at a rate of about 50 pounds per hour (22.7 kg/hr), hexene was fed to the reactor at a rate of about 6.1 pounds per hour (2.8 kg/hr) and hydrogen was fed to the reactor at a rate of 0.8 mPPH (0.0004 kg/hr). Ethylene was fed to maintain 220 psi ethylene partial pressure in the reactor. Hydrogen feed rate was controlled to maintain a 120 ppm hydrogen in the cycle gas. The production rate was about 34 PPH (15.4 kg/hr). The molar ratio of Catalyst 2 to Catalyst 1 was 1.1. All materials were combined and were passed through the injection nozzle into the fluidized bed. MMAO to catalyst ratio was controlled so that the final Al:Zr molar ratio was 450. A polymer residual zirconium of 0.42 ppm was calculated based on a reactor mass balance.

Example 3

An ethylene hexene copolymer (Sample 3) was produced according to the prodecure in example 1 except that ethylene was fed to the reactor at a rate of about 43 pounds per hour (19.5 kg/hr), hexene was fed to the reactor at a rate of about 4.8 pounds per hour (2.2 kg/hr) and hydrogen was fed to the reactor at a rate of 0.5 milli pounds per hour (0.0002 kg/hr). Hydrogen feed rate was controlled to maintain a 80 ppm hydrogen in the cycle gas. The production rate was about 25 PPH (11.3 kg/hr). The molar ratio of Catalyst 2 to Catalyst 1 was 0.93. MMAO to catalyst ratio was controlled so that the final Al:Zr molar ratio was 520. A polymer residual zirconium of 0.5 ppm was calculated based on a reactor mass balance.

Example 4

Samples 1 and 2 were tumble-mixed with 1,000 ppm of Irganox 1076 and 1,500 ppm of Irgafos and and then compounded on a 2.5 inch (6.4 cm) single screw (with double mixing head) Prodex extruder line. The compounded pelleted polymers were blown film extruded on the 3.5 inch(8.9 cm) single-screw Gloucester film line which is equipped with a die of 6 inch(15.2 cm) diameter. The die gap varied between 60 mil(1524 $\mu$m) and 90 mil(2286 $\mu$m) depending on samples. The die temperature was set at between 400° F.(204° C.) and 410° F.(210° C.) depending on the MI of samples. The output rate was maintained at 150 lbs/hr(68 kg/hr) and 1.0 mil(25.4 $\mu$m) film samples were produced with BUR of either at 2.5 or 3.0. Reference polymers were selected among similar family of polymers that are commercially available and whose flow properties match closely to those of samples.

The two polymers (Samples 1 and 2) had melt indexes of 0.74 dg/min and 0.98 dg/min, respectively, melt flow ratios of 18 and densities of 0.921 g/cc and were blown into films. Exceed 350D60 (an ethylene polymer available from ExxonMobil Chemical Company in Baytown, Tex. having a melt index of 1.0, a melt flow ratio of 17 and a 0.917 g/cc) was used as a reference polymer. At the output rate of 150 lb/hr(68 kg/hr) at die temperature of 41° F.(210° C.), Sample 1 exhibited slightly higher head pressure while Sample 2 showed lower head pressure/motor load than Exceed 350D60. Bubble stability of Samples 1 and 2 were comparable to that of reference polymer. One notable thing was the observation of excellent clarity from the blown bubble during film fabrication. Dart impact strength of 1.0 mil(25.4 $\mu$m) of films produced at a 3.0 blow up ratio of samples 1 and 2 were in the 610–630 g range in comparison with 880 g for Exceed 350D60. Other mechanical properties were comparable to those of reference film sample. The 45 degree gloss and haze (%) of films of Samples 1 and 2 were 61–75 and 5.2–6.9 compared to 41.5and 17 for Exceed 350D60.

Example 5

Sample 3 was mixed with 600 ppm of Dynamar™ 9613 and compounded on the Prodex line, was evaluated on the Gloucester film line as described above. The polymer had a melt index of 0.5 dg/min, a melt flow ratio of 18.5 and a density of 0.920 g/cc. This time, Exceed 399L60 (an ethylene polymer commercially available from ExxonMobil Chemical Company having a melt index of 0.75, a melt flow ratio of 17 and a density of 0.925 g/cc) was used as reference polymer. Due to lower MI, Sample 3 exhibited higher motor load and head pressure than Exceed 399L60. The bubble stability for sample 3 was as good as the reference polymer. 1.0 mil (25.4 $\mu$m) film sample produced at a 3.0 blow up ratio exhibited 800 g of dart impact strength in comparison with 180 g for Exceed 399L60. However, one should note that sample #3 has lower density (0.920 g/cc) than Exceed 399L60 (0.925 g/cc). A notable feature is again its film clarity. Haze (%) was 3.9 and 45 degree gloss was 86 for Sample 3. The data are reported in Table 1.

TABLE 1

| | Exceed 350D60 | Sample 1 | Sample 2 | Sample 3 | Exceed 399L60 |
|---|---|---|---|---|---|
| Melt Index ($I_2$) dg/min | 1 | 0.74 | 0.98 | 0.49 | 0.75 |
| Flow Index ($I_{21}$) dg/min | 17 | 13.4 | 17.6 | 8.98 | 12.75 |
| Melt Flow Ratio ($I_{21}/I_2$) | 17 | 18.2 | 18 | 18.5 | 17 |
| Density g/cc | 0.917 | 0.921 | 0.921 | 0.92 | 0.925 |
| Die set temp | 210° C. | 210° C. | 210° C. | 204° C. | 204° C. |
| Output Rate | 150 lb/hr (68 kg/hr) | 150 lb/hr (68 kg/hr) | 150 lb/hr (68 kg/hr) | 150 lb/hr (68 kg/hr) | 150 lb/hr (68 kg/hr) |
| Head Pressure | 4430 psi 30.5 MPa | 4740 psi 32.7 MPa | 3610 psi 24.9 MPa | 5440 psi 37.5 MPa | 4790 psi 33.0 MPa |
| Motor load (amp) | 165 | 165 | 125 | 190 | 180 |
| blow up ratio | 3 | 3 | 3 | 3 | 3 |
| Film gauge | 1 mil (25.4 μm) | 1 mil (25.4 μm) | 1 mil (25.4 μm) | 1 mil (25.4 μm) | 1 mil (25.4 μm) |
| Dart Impact Strength (g) | 880 | 610 | 630 | 800 | 180 |
| MD Tensile Strength | 6500 psi 44.8 MPa | 5900 psi 40.7 MPa | 5600 psi 38.6 MPa | 5600 psi 38.6 MPa | 5450 psi 37.6 MPa |
| TD Tensile Strength | 5600 psi 38.6 MPa | 5800 psi 40.0 MPa | 6300 psi 43.4 MPa | 5760 psi 39.7 MPa | 5700 psi 39.3 MPa |
| MD Elongation | 580% | 580% | 570% | 540% | 650% |
| TD Elongation | 620% | 630% | 640% | 610% | 730% |
| MD Modulus | 24200 psi 167 MPa | 35400 psi 244 MPa | 30500 psi 210 MPa | 29000 psi 200 MPa | 45400 psi 313 MPa |
| TD Modulus | 25800 psi 178 MPa | 35400 psi 244 MPa | 36000 psi 248 MPa | 36000 psi 248 MPa | 47400 psi 327 MPa |
| MD Elmendorf Tear | 284 g/mil (11.2 g/μm) | 260 g/mil (10.2 g/μm) | 300 g/mil (11.8 g/μm) | 200 g/mil (7.9 g/μm) | 230 g/mil (90.1 g/μm) |
| MD Elmendorf Tear | 366 g/mil (14.4 g/μm) | 410 g/mil (16.1 g/μm) | 440 g/mil (17.3 g/μm) | 340 g/mil (13.4 g/μm) | 350 g/mil (13.8 g/μm) |
| 45° Gloss | 41.5 | 75.4 | 61 | 85.7 | 46.8 |
| Haze | 17% | 5.2% | 6.9% | 3.9% | 15.7% |

Exceed 350D60 and Exceed 399L60 are commercially available linear low density polyethylene resins produced using a metallocene catalyst (ExxonMobil Chemical Company, Houston, Texas).

While the present invention has been described and illustrated by reference to particular embodiments, those of ordinary skill in the art will appreciate that the invention lends itself to variations not necessarily illustrated herein. For example, it is contemplated that two or more catalyst solutions of the invention can be used with two or more supported activators. Also, it is contemplated that a conventional Ziegler-Natta catalyst on a silica and/or magnesium support can be used with a supported activator and a catalyst solution of the invention. For this reason, then, reference should be made solely to the appended claims for purposes of determining the true scope of the present invention.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. Accordingly it is not intended that the invention be limited thereby.

We claim:

1. A process to polymerize one or more olefin(s) in the presence of a catalyst composition comprising combining a solid or a slurry comprising one or more metallocene catalyst compounds, a support and one or more activator(s) with a solution comprising one or more phenoxide catalyst compounds, and thereafter, introducing the combination into a polymerization reactor, wherein at least 50% of said one or more metallocene catalyst compounds and at least 50% of said one or more phenoxide catalyst compounds are deposited in or on said support.

2. The process of claim 1 wherein the slurry comprises a supported alumoxane and or a supported modified alumoxane.

3. The process of claim 1 wherein the slurry is formed by combining a supported activator with a liquid and a metallocene catalyst compound.

4. The process of claim 1 wherein the slurry comprises a supported catalyst system comprising a metallocene catalyst compound, an activator and a support.

5. The process of claim 4 wherein the supported catalyst system is prepared by combining the metallocene catalyst compound, the activator and the support in a solvent and thereafter removing the solvent.

6. The process of claim 4 wherein the supported catalyst system is prepared by combining the catalyst compound, the activator and the support in a solvent and thereafter spray drying the mixture.

7. The process of claim 1 wherein after combination at least 50% of the catalyst compounds are deposited in or on the support.

8. The process of claim 1 wherein after combination at least 80% of the catalyst compounds are deposited in or on the support.

9. The process of claim 1 wherein the activator comprises a non-coordinating anion or an ionizing compound.

10. The process of claim 1 wherein the activator comprises one or more from the group consisting of: trimethylammonium tetraphenylborate, triethylammonium tetraphenylborate, tripropylammonium tetraphenylborate, tri(n-butyl)ammonium tetraphenylborate, tri(t-butyl) ammonium tetraphenylborate, N,N-dimethylanilinium tetraphenylborate; N,N-diethylanilinium tetraphenylborate, N,N-dimethyl-(2,4,6-trimethylanilinium)tetraphenylborate, trimethylammonium tetrakis (pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis (pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis (pentafluorophenyl)borate, trimethylammonium tetrakis-(2,3,4,6-tetrafluorophenylborate triethylammonium tetrakis-(2,3,4,6-tetrafluorophenyl)borate, tripropylammonium tetrakis-(2,3,4,6-tetrafluorophenyl)borate; tri(n-butyl) ammonium tetrakis-(2,3,4,6-tetrafluoro-phenyl)borate, dimethyl (t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluoro-phenyl)borate, and N,N-dimethyl-(2,4,6-trimethylanilinium)tetrakis-(2,3,4,6-tetrafluorophenyl)borate, di-(i-propyl)ammonium tetrakis (pentafluorophenyl)borate, and dicyclohexylammonium tetrakis(pentafluorophenyl)borate, triphenyl-phosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl) borate.

11. The process of claim 1 wherein the metallocene catalyst compound is represented by the formula:

$$L^A L^B MQ_n \qquad (I)$$

$$\text{or } L^A A L^B MQ_n \qquad (II)$$

$$\text{or } L^C AJMQ_n \qquad (III)$$

where M is a Group 3 to 12 metal or a lanthanide or actinide element, $L^A$, $L^B$ and $L^C$ are each independently bulky ligands selected from the group consisting of cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, aminomethylphosphine ligands, pyrrolyl ligands, pyrozolyl ligands, carbazolyl ligands, borabenzene ligands, B-diketiminate ligands, fullerenes and hydrogenated versions thereof, each Q is independently a leaving group, A is a bridging group containing at least one Group 13 to 16 atom, J is a heteroatom ancillary ligand, and n is 0, 1 or 2, in formula III, M is bound to $L^C$ and J, and A is bound to $L^C$ and J.

12. The method of claim 1 wherein the metallocene catalyst compound is represented by the formula:

$$L^D MQ_2(YZ)X_n$$

where M is a Group 3 to 16 metal, $L^D$ is a bulky ligand that is bonded to M selected from the group consisting of selected from the group consisting of cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, aminomethylphosphine ligands, pyrrolyl ligands, pyrozolyl ligands, carbazolyl ligands, borabenzene ligands, B-diketiminate ligands, fullerenes and hydrogenated versions thereof, each Q is independently bonded to M and $Q_2(YZ)$ forms a unicharged polydentate ligand; A or Q is a univalent anionic ligand also bonded to M;

X is a univalent anionic group when n is 2 or X is a divalent anionic group when n is 1; n is 1 or 2.

13. The method of claim 1 wherein the metallocene catalyst compound is represented by the formula:

$$((Z)XA_t(YJ))_q MQ_n$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms; Y is contained in a heterocyclic ring J, where J comprises from 2 to 50 non-hydrogen atoms, Z is bonded to X, where Z comprises 1 to 50 non-hydrogen atoms; t is 0 or 1; when t is 1, A is a bridging group joined to at least one of X, Y or J, q is 1 or 2; n is an integer from 1 to 4.

14. The process of claim 1 wherein the phenoxide catalyst compound is represented by the formula:

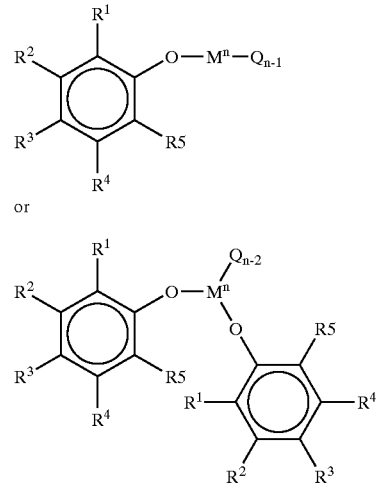

wherein $R^1$ is hydrogen or a $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, and any of $R^2$ to $R^5$ also may or may not be bound to M, O is oxygen, M is a group 3 to group 10 transition metal or lanthanide metal, n is the valence state of the metal M, Q is an alkyl, halogen, benzyl, amide, carboxylate, carbamate, thiolate, hydride or alkoxide group, or a bond to an R group containing a heteroatom which may be any of $R^1$ to $R^5$.

15. The process of claim 1 wherein the polymerization reactor is a gas phase polymerization reactor.

16. The process of claim 1 wherein the polymerization reactor is a slurry phase polymerization reactor.

17. The process of claim 1 wherein the metallocene catalyst compound is selected from one of the group consisting of:

bis(cyclopentadienyl)titanium dimethyl,
bis(cyclopentadienyl)titanium diphenyl, bis(cyclopentadienyl)zirconium dimethyl, bis(cyclopentadienyl)zirconium diphenyl,
bis(cyclopentadienyl)hafnium methyl and diphenyl,
bis(cyclopentadienyl)titanium di-neopentyl,
bis(cyclopentadienyl)zirconium di-neopentyl,
bis(cyclopentadienyl)titanium dibenzyl, bis(cyclopentadienyl)zirconium dibenzyl, bis(cyclopentadienyl)vanadium dimethyl,
bis(cyclopentadienyl)titanium methyl chloride,
bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride,
bis(cyclopentadienyl)zirconium phenyl chloride,
bis(cyclopentadienyl)titanium methyl bromide,
cyclopentadienyl titanium trimethyl, cyclopentadienyl zirconium triphenyl,
cyclopentadienyl zirconium trineopentyl, cyclopentadienyl zirconium trimethyl,
cyclopentadienyl hafnium triphenyl, cyclopentadienyl hafnium trineopentyl,
cyclopentadienyl hafnium trimethyl, pentamethylcyclopentadienyl titanium trichloride, pentaethylcyclopentadienyl titanium trichloride;
bis(indenyl)titanium diphenyl or dichloride,
bis(methylcyclopentadienyl)titanium diphenyl or dihalide, bis(1,2-dimethylcyclopentadienyl)titanium diphenyl or dichloride,
bis(1,2-diethylcyclopentadienyl)titanium diphenyl or dichloride,
bis(pentamethylcyclopentadienyl)titanium diphenyl or dichloride;
dimethyl silyldicyclopentadienyl titanium diphenyl or dichloride,
methyl phosphine dicyclopentadienyl titanium diphenyl or dichloride,
methylenedicyclopentadienyl titanium diphenyl or dichloride,
isopropyl(cyclopentadienyl)(fluorenyl)zirconium dichloride,
isopropyl(cyclopentadienyl)(octahydrofluorenyl) zirconium dichloride,
diisopropylmethylene(cyclopentadienyl)(fluorenyl) zirconium dichloride,
diisobutylmethylene(cyclopentadienyl)(fluorenyl) zirconium dichlorie,
ditertbutylmethylene(cyclopentadienyl)(fluorenyl) zirconium dichloride,
cyclohexylidene(cyclopentadienyl)(fluorenyl)zirconium dichloride,
diisopropylmethylene(2,5-dimethylcyclopentadienyl) (fluorenyl)zirconium dichloride,
isopropyl(cyclopentadienyl)(fluorenyl)hafniium dichloride,
diphenylmethylene(cyclopentadienyl)(fluorenyl)hafnium dichloride,
diisopropylmethylene(cyclopentadienyl)(fluorenyl) hafium dichloride,
diisobutylmethylene(cyclopentadienyl)(fluorenyl) hafnium dichloride,
ditertbutylmethylene(cyclopentadienyl)(fluorenyl) hafnium dichloride,
cyclohexylidene(cyclopentadienyl)(fluorenyl)hafnium dichloride,
diisopropylmethylene(2,5-dimethylcyclopentadienyl) (fluorenyl)hafnium dichloride, isopropyl (cyclopentadienyl)(fluorenyl)titanium dichloride,
diphenylmethylene(cyclopentadienyl)(fluorenyl)titanium dichloride,
diisopropylmethylene(cyclopentadienyl)(fluorenyl) titanium dichloride,
diisobutylmethylene(cyclopentadienyl)(fluorenyl) titanium dichloride,
ditertbutylmethylene(cyclopentadienyl)(fluorenyl) titanium dichloride,
cyclohexylidene(cyclopentadienyl)(fluorenyl)titanium dichloride,
diisopropylmethylene(2,5 dimethylcyclopentadienyl fluorenyl)titanium dichloride, racemic-ethylene bis(1-indenyl)zirconium (W) dichloride,
racemic-ethylene bis(4,5,6,7-tetrahydro-1-indenyl) zirconium (IV) dichloride,
racemic-dimethylsilyl bis(1-indenyl)zirconium (IV) dichloride,
racemic-dimethylsilyl bis(4,5,6,7-tetrahydro-1-indenyl) zirconium (IV) dichloride, racemic-1,1,2,2-tetramethylsilanylene bis(1-indenyl)zirconium (IV) dichloride, racemic-1,1,2,2-tetramethylsilanylene bis (4,5,6,7-tetrahydro-1-indenyl)zirconium (IV) dichloride, ethylidene (1-indenyl tetramethylcyclopentadienyl)zirconium (IV) dichloride,
racemic-dimethylsilyl bis(2-methyl-4-t-butyl-1-cyclopentadienyl)zirconium (IV) dichloride,
racemic-ethylene bis(1-indenyl)hafnimn (IV) dichloride, racemic-ethylene bis(4,5,6,7-tetrahydro-1-indenyl) hafiium (IV) dichloride,
racemic-dimethylsilyl bis(1-indenyl)hafaium (IV) dichloride, racemic-dimethylsilyl bis(4,5,6,7-tetrahydro-1-indenyl)hafnium (IV) dichloride,
racemic-1,1,2,2-tetramethylsilanylene bis(1-indenyl) hafniium (IV) dichloride, racemic-1,1,2,2-tetramethylsilanylene bis(4,5,6,7-tetrahydro-1-indenyl) hafnium (IV), dichloride, ethylidene(1-indenyl-2,3,4,5-tetramethyl-1-cyclopentadienyl)hafnium (IV) dichloride,
racemic-ethylene bis(1-indenyl)titanium (IV) dichloride, racemic-ethylene bis(4,5,6,7-tetrahydro-1-indenyl) titanium (IV) dichloride,
racemic-dimethylsilyl bis(1-indenyl)titanium (IV) dichloride,
racemic-dimethylsilyl bis(4,5,6,7-tetrahydro-1-indenyl) titanium (IV)dichloride,
racemic-1,1,2,2-tetramethylsilanylene bis(1-indenyl) titanium (IV) dichloride
racemic-1,1,2,2-tetramethylsilanylene bis(4,5,6,7-tetrahydro-1-indenyl)titanium (IV) dichloride, and ethylidene(1-indenyl-2,3,4,5-tetramethyl-1-cyclopentadienyl)titanium (IV) dichloride.

18. The process of claim 1 wherein the phenoxide catalyst compound is selected from one of the group consisting of:
(N-methyl-3,5-di-t-butylsalicylimino)zirconium(IV) dibenzyl;
bis(N-ethyl-3,5-di-t-butylsalicylimino)zirconium(IV) dibenzyl;
bis(N-iso-propyl-3,5-di-t-butylsalicylimino)zironium(IV) dibenzyl;
bis(N-t-butyl-3,5-di-t-butylsalicylimino)zirconium(IV) dibenzyl;
bis(N-benzyl-3,5-di-t-butylsalicylimino)zirconium(IV) dibenzyl;
bis(N-hexyl-3,5-di-t-butylsalicylimino)zirconium(IV) dibenzyl;
bis(N-phenyl3,5-di-t-butylsalicylimino)zirconium(IV) dibenzyl;
bis(N-methyl-3,5-di-t-butylsalicylimino)zirconium(IV) dibenzyl;
bis(N-benzyl-3,5-di-t-butylsalicylimino)zirconium(IV) dichloride;
bis(N-benzyl-3,5-di-t-butylsalicylimino)zirconium(IV) dipivalate;
bis(N-benzyl-3,5-di-t-butylsalicylimino)titanium(IV) dipivalate;
bis(N-benzyl-3,5-di-t-butylsalicylimino)zirconium(IV) di(bis(dimethylamide));
bis(N-iso-propyl-3,5-di-t-amylsalicylimino)zirconium (IV) dibenzyl;
bis(N-iso-propyl-3,5-di-t-octylsalicylimino)zirconium (IV) dibenzyl;
bis(N-iso-propyl-3,5-di-(1',1'-dimethylbenzyl) salicylimino)zirconium(IV) dibenzyl;
bis(N-iso-propyl-3,5-di-(1',1'-dimethylbenzyl) salicylimino)titanium(IV) dibenzyl;
bis(N-iso-propyl-3,5-di-(1',1'-dimethylbenzyl) salicylimino)hafnium(IV) dibenzyl;
bis(N-iso-butyl-3,5-di-(1',1'-dimethylbenzyl) salicylimino)zirconium(IV) dibenzyl;
bis(N-iso-butyl-3,5-di-(1',1'-dimethylbenzyl) salicylimino)zirconium(IV) dichloride;
bis(N-hexyl-3,5-di-(1',1'-dimethylbenzyl)salicylimino) zirconium(IV) dibenzyl;
bis(N-phenyl-3,5-di-(1',1'-dimethylbenzyl)salicylimino) zirconium(IV) dibenzyl;
bis(N-iso-propyl-3,5-di-(1'-methylcyclohexyl) salicylimino)zirconium(IV) dibenzyl;
bis(N-benzyl-3-t-butylsalicylimino)zirconium(IV) dibenzyl;
bis(N-benzyl-3-triphenylmethylsalicylimino)zirconium (IV) dibenzyl;
bis(N-iso-propyl-3,5-di-trimethylsilylsalicylimino) zirconium(IV) dibenzyl;
bis(N-iso-propyl-3-(phenyl)salicylimino)zirconium(IV) dibenzyl;
bis(N-benzyl-3-(2',6'-di-iso-propylphenyl)salicylimino) zirconium(IV) dibenzyl;
bis(N-benzyl-3-(2',6'-di-phenylphenyl)salicylimino) zirconium(IV) dibenzyl;
bis(N-benzyl-3-t-butyl-5-methoxysalicylimino) zirconium(IV) dibenzyl;
bis(2-(2H-benzotriazol-2-yl)-4,6-di-t-amylphenoxide) zirconium(IV) dibenzyl;
bis(2-(2H-benzotriazol-2-yl)-4,6-di-t-amylphenoxide) zirconium(IV) dichloride;
bis(2-(2H-benzotriazol-2-yl)-4,6-di-t-amylphenoxide) zirconium(IV) di(bis(dimethylamide)); bis(2-(2H-benzotriazol-2-yl)-4,6-di-(1',1'-dimethylbenzyl) phenoxide)zirconium(IV) dibenzyl; bis(2-(2H-benzotriazol-2-yl)-4,6-di-t-amylphenoxide)titanium (IV) dibenzyl; bis(2-(2H-benzotriazol-2-yl)-4,6-di-(1', 1'-dimethylbenzyl)phenoxide)titanium(IV) dibenzyl; bis(2-(2H-benzotriazol-2-yl)-4,6-di-(1',1'-dimethylbenzyl)phenoxide)titanium(IV) dichloride; bis(2-(2H-benzotriazol-2-yl)-4,6-di-(1', 1'-dimethylbenzyl)phenoxide)hafnium(IV) dibenzyl; (N-phenyl-3,5-di-(1',1'-dimethylbenzyl)salicylimino) zirconium(IV) tribenzyl; (N-(2',6'-di-iso-propylphenyl)-3,5-di-(1',1'-dimethylbenzyl) salicylimino)zirconium(IV) tribenzyl; (N-(2',6'-di-iso-propylphenyl)-3,5-di-(1',1'-dimethylbenzyl) salicylimino)titanium(IV) tribenzyl; and (N-(2',6'-di-iso-propylphenyl)-3,5-di-(1',1'-dimethylbenzyl) salicylimino)zirconium(IV) trichloride.

19. The process of claim 1 wherein the metallocene catalyst compound comprises bis(2, 4methylbutylcyclpentadienyl)zirconium dihalide and the phenoxide catalyst compound comprises bis(N-iso-butyl-3-t-butylsalicyclimino)zirconium (IV)dibenzyl.

20. The process of claim 1 wherein prior to combination the solution comprises less than 1 weight percent activator.

21. The method of claim 19 wherein the activator comprises supported alumoxane.

22. The method of claim 1 wherein the slurry comprises mineral oil and has a viscosity of about 130 to about 2000 cP at 20° C.

23. The method of claim 1 wherein the combination of the solution and the slurry has a viscosity of about 130 to about 2000 cP at 20° C.

24. The method of claim 1 wherein the solution does not comprise mineral oil and comprises up to 20 weight % of the combination of the solution and the slurry.

25. The method of claim 1 wherein the solution comprises mineral oil and comprises up to 90 weight % of the combination of the solution and the slurry.

26. The method of claim 1 wherein the solution and the slurry are mixed for up to about 120 minutes prior to being introduced into the reactor.

27. The method of claim 1 wherein the solution and the slurry are mixed for about 1 minute to about 60 minutes prior to being introduced into the reactor.

* * * * *